United States Patent
Burli

(10) Patent No.: US 11,205,047 B2
(45) Date of Patent: Dec. 21, 2021

(54) HIERARCHICAL SEARCH FOR IMPROVED SEARCH RELEVANCE

(71) Applicant: ServiceNow, Inc., Santa Clara, CA (US)

(72) Inventor: Badarinarayan Parthasarathi Burli, Bengaluru (IN)

(73) Assignee: ServiceNow, Inc., Santa Clara, CA (US)

( * ) Notice: Subject to any disclaimer, the term of this patent is extended or adjusted under 35 U.S.C. 154(b) by 295 days.

(21) Appl. No.: 16/562,080

(22) Filed: Sep. 5, 2019

(65) Prior Publication Data

US 2021/0073328 A1  Mar. 11, 2021

(51) Int. Cl.

| | |
|---|---|
| *G06F 40/10* | (2020.01) |
| *G06F 16/48* | (2019.01) |
| *G06F 40/284* | (2020.01) |
| *G06F 16/33* | (2019.01) |
| *G06F 16/332* | (2019.01) |
| G06F 16/2455 | (2019.01) |
| G06F 16/2457 | (2019.01) |
| G06F 16/483 | (2019.01) |

(52) U.S. Cl.
CPC ........ *G06F 40/284* (2020.01); *G06F 16/3329* (2019.01); *G06F 16/3335* (2019.01); *G06F 16/48* (2019.01); *G06F 16/2455* (2019.01); *G06F 16/2457* (2019.01); *G06F 16/24573* (2019.01); *G06F 16/483* (2019.01); *G06F 40/10* (2020.01)

(58) Field of Classification Search
None
See application file for complete search history.

(56) References Cited

U.S. PATENT DOCUMENTS

| | | | |
|---|---|---|---|
| 5,265,065 A | * | 11/1993 | Turtle ................ G06F 16/3346 |
| 5,978,594 A | | 11/1999 | Bonnell |
| 6,321,229 B1 | | 11/2001 | Goldman |
| 6,609,122 B1 | | 8/2003 | Ensor |
| 6,816,898 B1 | | 11/2004 | Scarpelli |
| 6,895,586 B1 | | 5/2005 | Brasher |
| 7,020,706 B2 | | 3/2006 | Cates |
| 7,027,411 B1 | | 4/2006 | Pulsipher |

(Continued)

OTHER PUBLICATIONS

Wikipedia tf-idf, https://en.wikipedia.org/wiki/Tf%E2%80%93idf.

*Primary Examiner* — Richard Z Zhu
(74) *Attorney, Agent, or Firm* — Fletcher Yoder PC

(57) ABSTRACT

A computer-implemented method is provided that includes receiving a search query and, responsive to the search query, providing one or more textual comments relevant to the search query. This includes tokenizing the search query and calculating a set of query term frequency metrics. A set of records relevant to the search query is then selected, from a persistent storage, based on determined similarities between the query term frequency metrics and frequency metrics determined for the records in the persistent storage. Textual comments within the selected records are associated with usefulness metrics. The textual comments relevant to the search query are selected by selecting those textual comments within the selected records that are associated with usefulness metrics that are within a pre-determined range, e.g., an inter-quartile range for a population of usefulness metrics.

20 Claims, 9 Drawing Sheets

(56) References Cited

U.S. PATENT DOCUMENTS

| | | | |
|---|---|---|---|
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,870,279 B2 * | 1/2011 | Chuang | H04L 65/602 709/231 |
| 7,877,783 B1 | 1/2011 | Cline | |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,151,261 B2 | 4/2012 | Sirota | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,856,145 B2 * | 10/2014 | Parikh | G06F 16/24575 707/750 |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,171,078 B2 * | 10/2015 | Imig | G06F 16/951 |
| 9,239,857 B2 | 1/2016 | Trinon | |
| 9,317,327 B2 | 4/2016 | Apte | |
| 9,348,920 B1 * | 5/2016 | Kesin | G06N 20/00 |
| 9,363,252 B2 | 6/2016 | Mueller | |
| 9,460,195 B1 * | 10/2016 | Zhang | G06F 16/36 |
| 9,501,569 B2 * | 11/2016 | Song | G06F 16/951 |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 9,819,729 B2 | 11/2017 | Moon | |
| 2016/0142787 A1 * | 5/2016 | Mohamed | G06F 16/438 725/53 |
| 2019/0287517 A1 * | 9/2019 | Green | G10L 15/08 |
| 2019/0349321 A1 * | 11/2019 | Cai | G06F 40/237 |
| 2019/0377736 A1 * | 12/2019 | Balasubramanian | G06F 11/3672 |
| 2020/0279017 A1 * | 9/2020 | Norton | G06F 16/36 |

* cited by examiner

← 710

USER: JUN 30, 2019 8:04PM CST

I CAN'T SEEM TO FORWARD EMAILS WITH ATTACHMENTS... THE ATTACHMENTS GET REMOVED WHEN I HIT SEND

TECH: JUN 30, 2019 8:06PM CST

THE ATTACHMENTS DON'T SHOW UP IN THE DRAFT FORWARD EMAIL?

USER: JUN 30, 2019 8:04PM CST

NO, THEY'RE THERE WHEN THE WINDOW COMES UP. BUT THE RECIPIENTS DON'T RECEIVE THE ATTACHMENTS.

TECH: JUN 30, 2019 8:04PM CST

ARE THE ATTACHMENTS THERE IN YOUR SENT EMAILS?

USER: JUN 30, 2019 8:06PM CST

YES.

730

RECORD 847269 MAR 12, 2016 11:23AM CST

IT LOOKS LIKE THE ATTACHMENTS ARE GETTING BLOCKED BY YOUR RECIPIENTS' EMAIL FILTER. ASK THEM TO INQUIRE ON THEIR END 

RECORD 586495 SEPT 2, 2018 3:56PM CST

SOME VERSIONS OF YOUR EMAIL CLIENT HAVE AN ISSUE WITH FAILING TO SEND CERTAIN ATTACHMENTS OVER A CERTAIN SIZE. WHAT IS YOUR CLIENT VERSION? 

HIERARCHICAL SEARCH FOR IMPROVED SEARCH RELEVANCE

BACKGROUND

When a user of an information network or other technological system experiences a problem, the problem has likely occurred before. In a managed network, records may be kept of such problems in order to track and organize their resolution, to facilitate management of technical or non-technical aspects of an organization, to inform technology upgrades, or to provide some other benefit. Accordingly, such records may contain useful information relevant to the resolution of the user's current problem. However, finding a relevant record within a set of records is a difficult technical problem. Some search algorithms may have excellent sensitivity, returning many records including one or more relevant records. However, many algorithms exhibit a tradeoff between sensitivity and selectivity, also returning many non-relevant records. Returning many records, with many of the returned records being non-useful, can requiring a technician or other user to spend time sifting through the returned records in order to find useful information. Conversely, a highly selective algorithm may exhibit poor sensitivity, failing to identify many relevant records.

SUMMARY

A persistent storage medium can include databases or other information storage and lookup structures that contain many records describing the operation of a managed network or some other information technology system. The records may include problem tickets, incident reports, service outage events, software or hardware upgrades, or other events related to the operation of the managed network. Accordingly, the set of records may include a great deal of information that is useful for diagnosing and/or resolving newly-occurring problems. Indeed, many problems experienced by users of a managed network or other information technology system occur many times to many different users, and may likely be resolved in similar fashion. Thus, it could be beneficial to provide a search and retrieval system to find such useful information within the records.

However, it is difficult to find and retrieve useful portions of such information. More sensitive search algorithms may return more useful results, but also return more non-useful results, requiring additional effort to find the useful results from the entire search result. More selective search algorithms may fail to identify important results.

A search method is provided herein that takes advantage of structure within records that are related to the operation of a managed network or other information technology system. Each record includes a textual summary and one or more textual comments. The textual summaries may be short- or long-form descriptions of a problem experienced by a user (e.g., a user who initiated a problem ticket related to the record), descriptions of a problem and/or of its diagnosis and solution written by a technician, or some other textual summary of the record. The textual comments may be emails, messenger application messages, resolution summaries, ticket elevation notices, technician notes related to the diagnosis and/or resolution of a problem, or some other textual comment within the record. A search query is tokenized (e.g., by removing common words, stop words, punctuation and/or some other non-relevant content) and compared to tokenized versions of the textual summaries in order to identify a set of relevant records. The scope of returns from this comparison may be set according to a search scope, e.g., to provide more results to a technician searching for a resolution, but to provide fewer results to a user trying to resolve the problem on their own, in order to reduce irritation.

The records within the relevant set may be, themselves, quite extensive, containing many emails, comments, technician notes, or other contents. It is therefore also beneficial to identify portions of text within records of the relevant set that may be useful. Thus, the records of the relevant set are analyzed to return 'useful' textual comments from the records. "Useful" records are those that are more likely to contain information that is likely to help resolve problems related to record. A "usefulness metric" may be calculated for each textual comment (e.g., for each email, messenger message, etc.) and used to determine which of the textual comments to return in response to a search query. Textual comments returned in response to a search query could be limited to those having usefulness metrics within a specified range of usefulness metrics. This could be done to provide textual comments that are likely to be relevant to other problems but that are not so specific that they are unlikely to be able to generalize. For example, textual comments having usefulness indexes within an inter-quartile range of a population of usefulness indexes (determined, e.g., from the usefulness indexes of all of the textual comments in a set of records) could be returned.

Such a usefulness metric may be determined based on manual tags for the textual comments (e.g., votes, manual annotation that the comment would be useful in resolving similar problems). Additionally or alternatively, such a usefulness metric may be determined based on the textual contents. For example, a usefulness metric could be determined based on the proportion of words or tokens of the textual comment that are not part of a common words list, a stop word list, a list of punctuation, or some other list of non-relevant textual content.

Accordingly, a first example embodiment may involve a computer-implemented method that includes: (i) receiving, from a client device, a search query, wherein persistent storage contains: (a) a plurality of records related to operation of a managed network, the records containing textual summaries and textual comments, (b) tokenized versions of the textual summaries and tokenized versions of the textual comments, both lacking stop words, common words, and punctuation, (c) record term frequency metrics for the tokenized versions of the textual summaries, and (d) usefulness metrics for the tokenized versions of the textual comments; (ii) tokenizing the search query to form query tokens for terms in the search query; (iii) calculating, from the query tokens, a set of query term frequency metrics; (iv) determining similarities between the set of query term frequency metrics and the record term frequency metrics; (v) based on the similarities, retrieving, from the persistent storage, a relevant set of the records; (vi) selecting, from the relevant set of the records, relevant textual comments that have usefulness metrics within a pre-determined range; and (vii) providing, to the client device and as a result of the search query, the relevant textual comments.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts a messenger application interface with suggested historical comments, in accordance with example embodiments.

DETAILED DESCRIPTION

Figure 1:
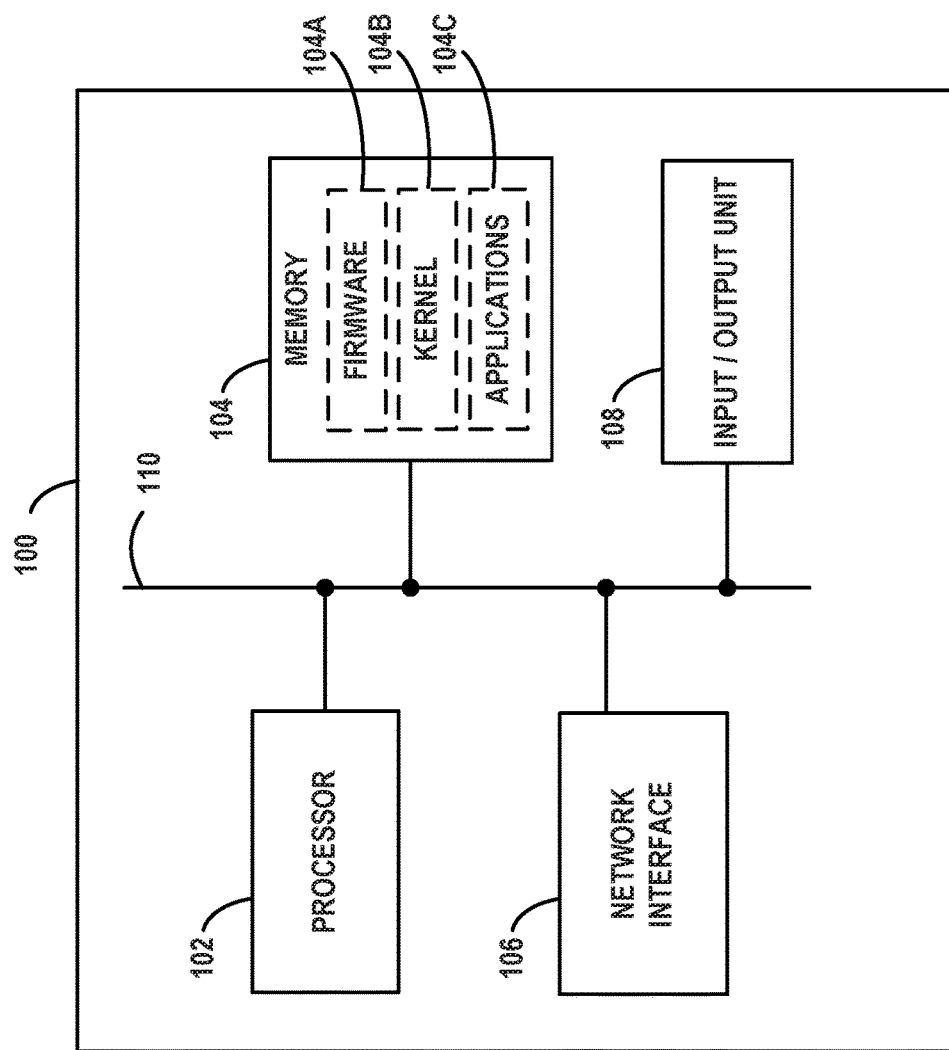
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
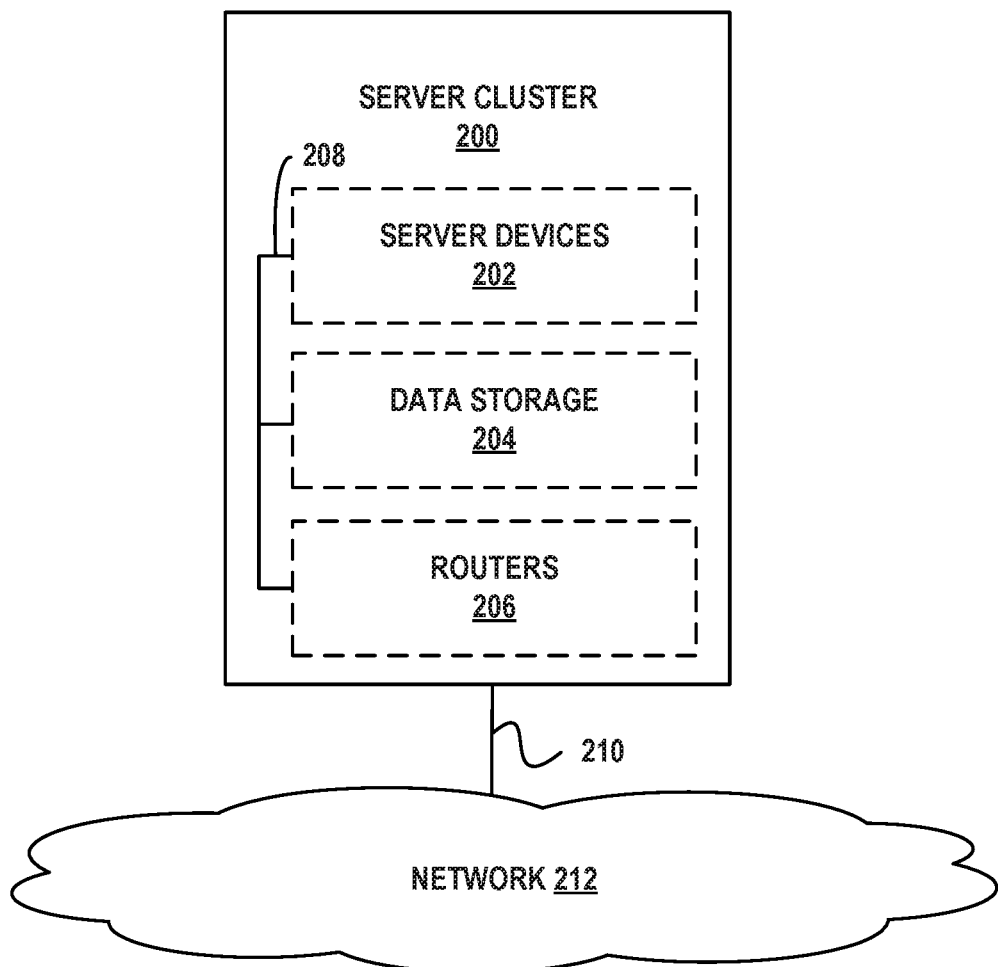
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
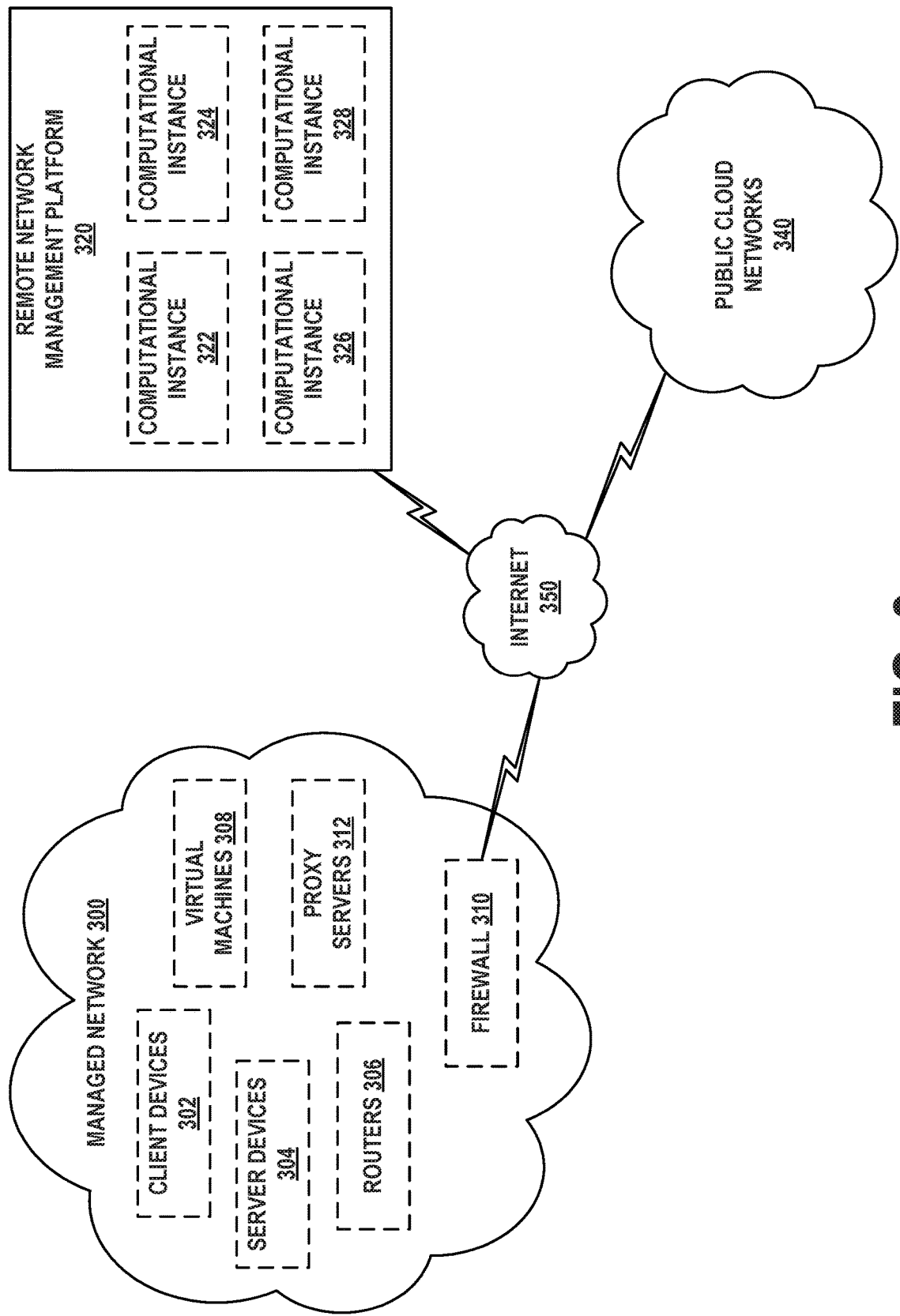
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
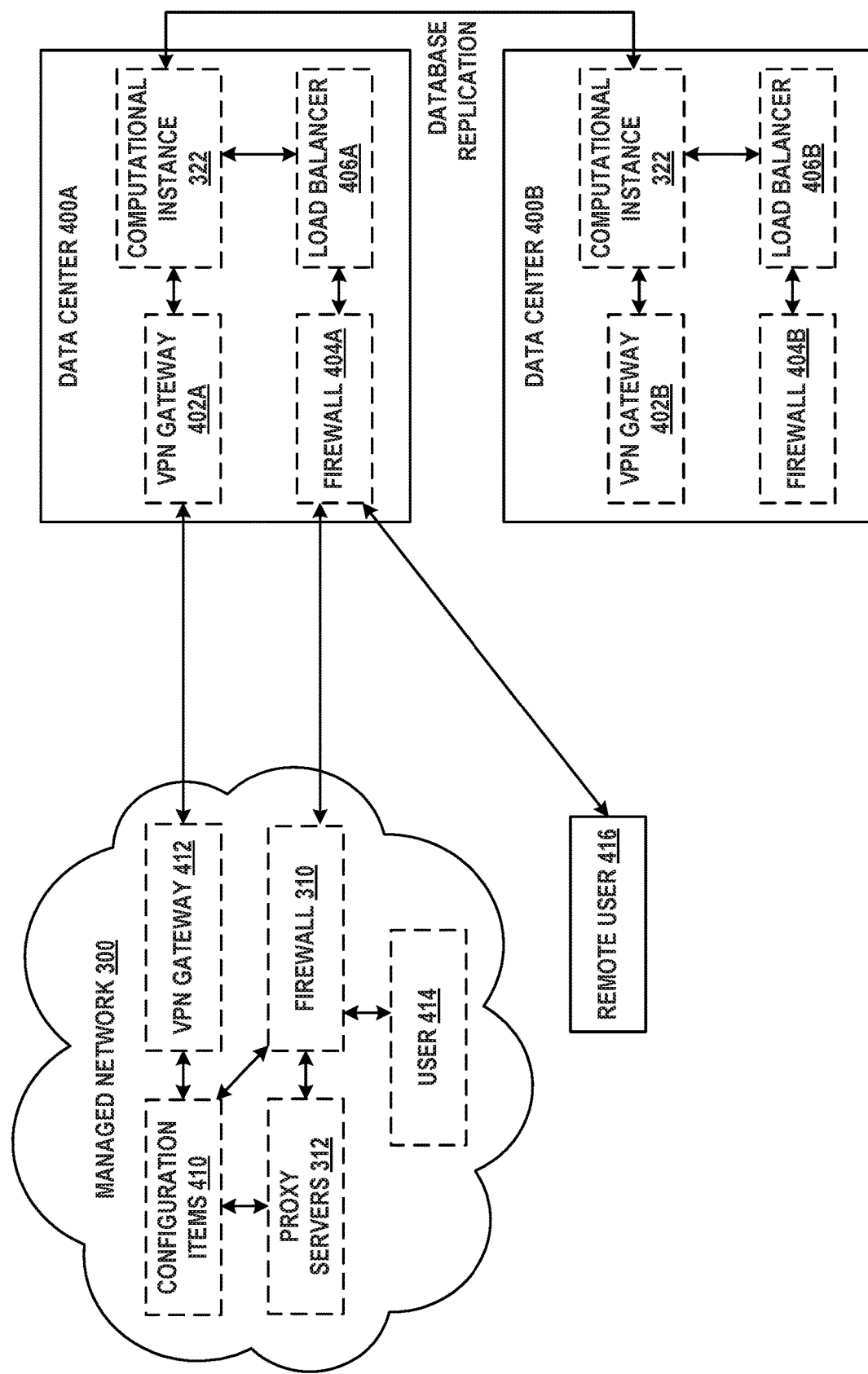
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
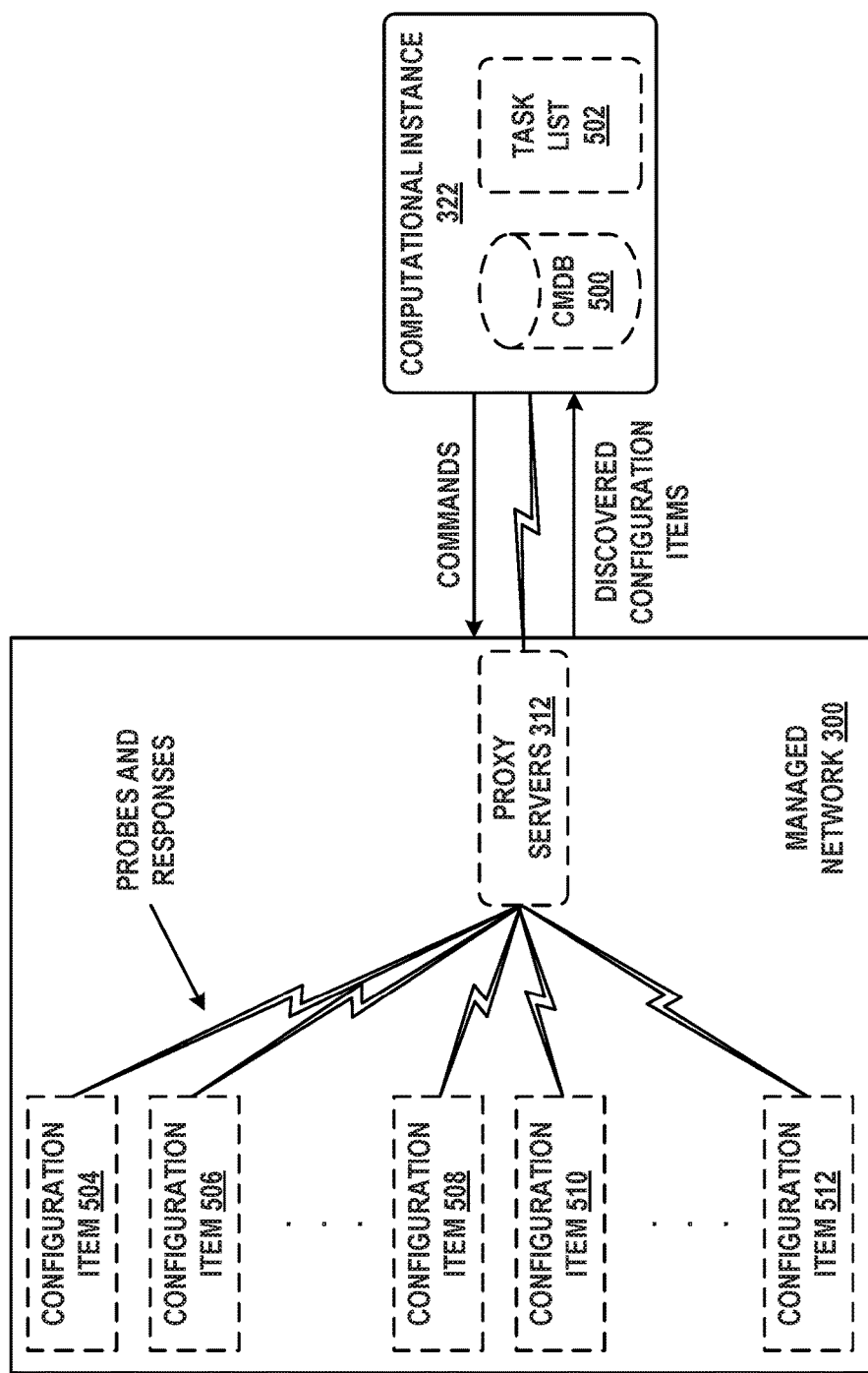
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
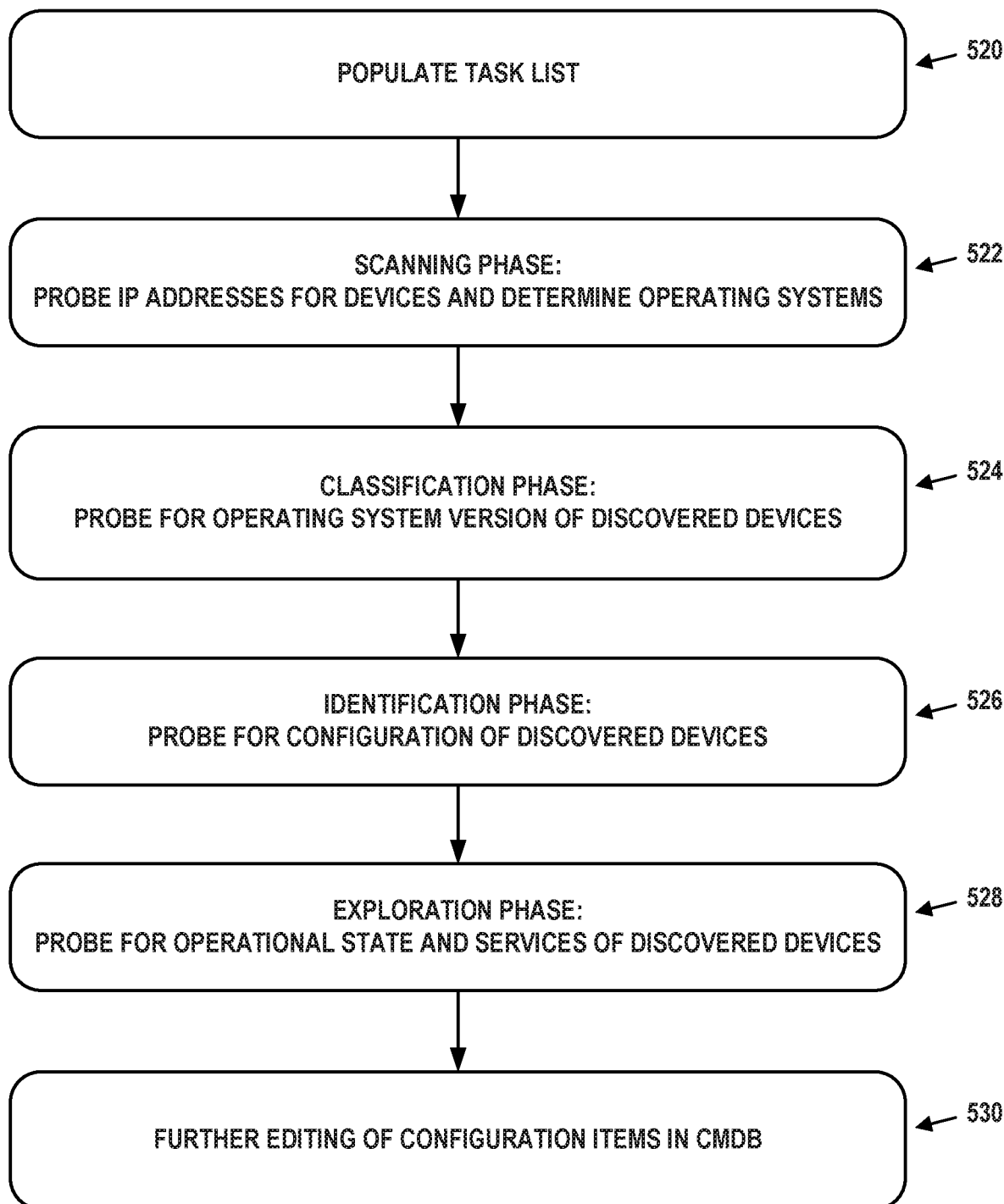
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Relevant Comment Identification

A problem or other event affecting a managed network or other information technology system is likely to have occurred many times, to many different users. Such common problems are likely to have similar resolutions. Accordingly, it can be beneficial to apply robust search and retrieval methods to find, within records of past problems or events (e.g., records associated with problem tickets, incident reports, service outage events, software or hardware upgrades, or other events related to the operation of the managed network), textual comments or other information that may be helpful in diagnosing and/or resolving newly-occurring problems. Such textual comments may include emails, messenger application messages, resolution summaries, ticket elevation notices, technician notes related to the diagnosis and/or resolution of a problem, or some other textual comment within the record.

Accordingly, methods may be applied to identify, within a set of records related to operation of a managed network, textual comments or other information relevant to a search query generated by a technician or other user. Such a query could be generated by a technician looking to find information relevant to the diagnosis and resolution of a user's problem (e.g., a problem represented by a problem ticket generated by the user). In another example, such a query could be generated by a user looking to solve their own problem (e.g., as part of an online process provided to attempt to guide users to solve their own problems before escalating to a support technician).

However, it can be difficult to find and retrieve useful portions of such information. More sensitive search algorithms may return more useful results, but also return more non-useful results, requiring additional effort to find the useful results within the entire search result. More selective search algorithms may fail to identify useful results.

Embodiments are provided herein that apply a two-level approach to identifying and returning relevant information, from a set of records related to the operation of a managed network or other information technology system, in response to a technician or other user's search query. The first level includes identifying a set of relevant records, based on textual summaries within each of the records. The textual summaries may be short- or long-form descriptions of a problem experienced by a user (e.g., a user who initiated a problem ticket related to the record), descriptions of a problem and/or of its diagnosis and solution written by a technician, or some other textual summary of the record. This first level limits the search results to those records that are likely to be related to the content of the search query.

The second level includes identifying, within the set of relevant records, textual comments that have "usefulness metrics" within a pre-determined range. This allows for the rejection of textual comments that relatively lacking in useful information (e.g., that only contain greetings, pleasantries, etc.) while also rejecting textual comments that may be overly specific to a particular record, and not generalizable. This second level is beneficial because each record may be very large and contain an amount of irrelevant and/or non-generalizable comment data (e.g., pleasantries, hardware and software specifics particular to a particular user's context, etc.). Extracting only those textual comments that have usefulness metrics within the pre-determined range increases the likelihood that content provided in response to the search query is helpful to resolution of the problem represented by the search query.

The usefulness metrics of the textual comments could be determined based on the textual content of the textual comments (e.g., based on a tokenized version of the textual comments) and/or other information (e.g., user-generated data regarding the usefulness of the comments in solving past problems). For example, the usefulness metrics could be determined based on the fraction of the textual comments that are not within a list of common words. Such non-removed words are more likely to be technical words, code, API calls, or other technical content, and so a comment that includes more such non-common words is more likely to contain information that is useful for resolving technical problems.

Figure 6:
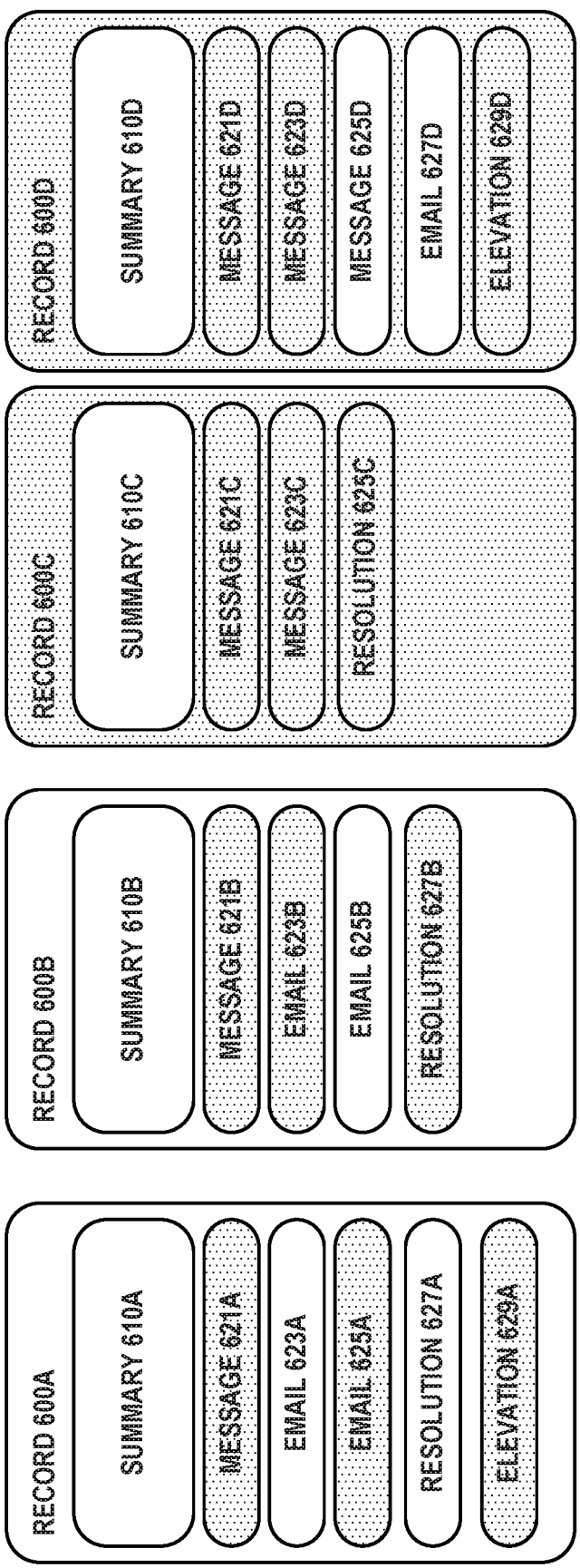
FIG. 6 depicts contents of records, in accordance with example embodiments.

This two-level search method is illustrated in FIG. 6. FIG. 6 shows four records 600A-D related to the operation of a managed network. Each record contains respective summaries 610A-D and sets of textual comments 621A, 621B, 621C, 621D, 623A, 623B, 623C, 623D, 625A, 625B, 625C, 625D, 627A, 627B, 627D, 629A, 629D. These textual comments can include, e.g., messages from an instant messaging service 621A-D, 623C, 623D, 625D, emails 623A, 625A, 623B, 625B, 627D, problem resolutions 627A, 627B, 625C, ticket elevations 629A, 629D, or other types of textual comments. Within each record, certain of the textual comments have usefulness metrics that are within a pre-specified range (e.g., an inter-quartile range of the population of usefulness metrics for all of the textual comments in a corpus of records). Textual records having usefulness metrics outside of the pre-specified range are indicated in FIG. 6 by shading. Two of the records 600A, 600B are sufficiently similar to a search query that they are within a relevant set of records. The other records 600C, 600D are not, and so are indicated in FIG. 6 by shading. Thus, according to the methods described herein, the indicated textual comments 623A, 627A, 625B would be returned in response to the search query.

A. Selecting a Relevant Set of Records

Selecting a relevant set of records based on a search query could be performed in a variety of ways. In some embodiments, a similarity value could be determined between the search query and the textual summary of each of the records, and the relevant set selected based on the determined similarity value. This could include selecting the top n most similar records to the search query. In order to improve the search results, the similarity value could be determined based on tokenized versions of the search query and the textual summaries. For example, based on tokenized versions of the search query and/or textual summaries that have had common words (e.g., words from a pre-determined corpus of English words), stop words (e.g., words manually selected due to describing generic and/or ambiguous technical topics), punctuation, and/or other contents removed. The textual summaries in each record could be tokenized before receiving a search query and/or the records could be received already containing tokenized versions of the textual summaries.

Determining the similarity between a tokenized search query and a tokenized textual summary could include determining, for each token in the search query and the textual summary, respective term frequency metrics. The set of term frequency metrics for the search query and the set of term frequency metrics for the textual summary of the record could then be used to determine the similarity between the search query and the record. This could include determining an inner product between the sets of term frequency metrics, determining a cosine of an angle between the sets of term frequency metrics, determining an intersection-over-union between the sets of frequency metrics, determining an intersection-over-number of members of tokens in the search query, or determining some other measure of similarity between the tokens of the search query and the tokens of the textual summary of a record.

Term frequency metrics could be determined for tokens of a search query and/or a textual summary of a record in a variety of ways. The term frequency metric could be determined based on a number of times a token occurs in the search query or textual summary normalized to a rate of occurrence of that token in the search query or textual summary or in some other corpus of textual information (e.g., according to a term frequency-inverse document frequency statistic). For example, the term frequency metric for a term in a textual summary of a record could be determined based on a product of a (i) number of times that the term appears in the textual summary, and a (ii) logarithm of a quotient of a count of the records (e.g., in a database containing the records) and a count of the records containing the term. This is illustrated by:

$$f_{t,d} \cdot \log \frac{N}{n_t}$$

where $f_{t,d}$ is the number of times the term 't' appears in textual summary 'd', N is the total number of records, and $n_t$ is the number of records in which term 't' appears.

The term frequency metric for a term in a search query could be determined similarly, based on a product of (i) a number of times that the term appears in the search query, and (ii) a logarithm of a quotient of a count of the records (e.g., in a database containing the records) and a count of the records containing the term. This is illustrated by:

$$f_{t,q} \cdot \log \frac{N}{n_t}$$

where $f_{t,q}$ is the number of times the term 't' appears in search query 'q', N is the total number of records, and $n_t$ is the number of records in which term 't' appears.

In some examples, the term frequency metric could be a binary or otherwise discrete-valued quantity, e.g., a '1' if the term is present in the search query/textual summary, and a '0' if not. The term frequency metrics for the search query could be such binary-valued quantities while the term frequency metrics for the textual summaries could be determined in some other manner.

Factors in addition to the similarity between sets of frequency metrics could be used to select a relevant set of records. For example, some additional metric could be determined for the records and used to set a search scope. The search scope could be used to control whether a record is selected, regardless of the determined similarity value for that record. Setting such a search scope could include controlling an extent to which, for each of the relevant set of the records, each of the tokens of the search query is required to be in the tokenized versions of the textual summaries.

Such an extent of overlap could be measured by counting the number of tokens that overlap between the search query and the textual summary, and comparing that number to a threshold. In some examples, the amount of overlap could be normalized, e.g., to a number of tokens present in the search query and/or the textual record. For example, the search scope could be determined for a particular record based on a quotient of (i) an intersection of the query tokens and the tokenized versions of the textual summary for the particular record, and (ii) a count of the query tokens. This is illustrated by:

$$\frac{\|Q \cap S\|}{\|Q\|}$$

where Q is the set of query tokens, S is the set of textual summary tokens, and double vertical brackets ("$\|\ \|$") denotes the number of members of a set.

The search scope could be set by a user and/or set according to information about the user (e.g., set to a wider scope if the user is a technician relative to if the user is an end-user of customer). For example, the search query could be entered into a graphical user interface of a client device. The graphical user interface could also contain a drop-down menu that controls a threshold search scope value, which could be used, e.g., to set a threshold for the search scope. Such a search scope threshold could be used, e.g., to compare to the quotient above in order to determine whether the particular record should be included in the set of relevant records. So, for example, the threshold could be set to a higher value (e.g., 0.95) to return only those records whose textual summaries overlap with the search query to a greater extent (e.g., by more than 95%). The threshold could be set to a lower value (e.g., 0.65) to return more records, whose textual summaries overlap with the search query by a lesser extent (e.g., by more than 65%).

B. Identifying Useful Textual Comments within a Record

The usefulness metric of a textual comment could be determined in a variety of ways. The usefulness metric could be determined based on the contents of the textual comment, e.g., based on a tokenized version of the textual comment that has had common words (e.g., words from a predetermined corpus of English words), stop words (e.g., words manually selected due to describing generic and/or ambiguous technical topics), punctuation, and/or other contents removed. The usefulness index can be calculated such that it is likely to be low for textual comments that contain little technical content and that, instead, contain mostly common words, words in a list of stop words, and/or punctuation. For example, an email or other textual comment that is mostly greetings, pleasantries, or other non-technical text will have a low usefulness metric. Conversely, the usefulness metric can be calculated such that a textual comment containing many technical terms, program code, API calls, or other technical content will have a high usefulness metric.

In some examples, such a usefulness index could be determined based on a fraction of the textual comment that is tokenized content relative to the total content of the textual comment (e.g., tokenized content plus common words, stop words, etc.). For example, the usefulness metric could be determined based on a quotient of: (i) a first count of tokens in the tokenized version of the particular textual comment that lacks the stop words, common words, and punctuation, and (ii) a second count of tokens in the tokenized version of the particular textual comment that includes the stop words, common words, and punctuation. This is illustrated by:

$$\frac{m_c^*}{m_c}$$

where $m_c^*$ is the number of tokens in the tokenized version of the particular textual comment that lacks stop words, common words, and punctuation and $m_c$ is the number of tokens in the tokenized version of the particular textual comment that includes the stop words, common words, and punctuation.

Such a usefulness metric could additionally or alternatively be determined based on a degree of overlap between tokens of the textual comment and tokens of the textual summary of the parent record and/or tokens of a tokenized version of the search query, votes or other user-generated feedback regarding the usefulness of the textual comment, or other information about the textual comment. For example, the usefulness metric of a particular textual record could be set to zero (to ensure it is not returned) if it has received more than a threshold amount of negative feedback from users. In another example, the usefulness metric of a particular textual record could be determined by dividing the token overlap between the textual comment and the textual summary (or some other portion of the record) divided by the number of tokens in the search query and/or normalized in some other manner. The textual comments in each record could be tokenized before receiving a search query and/or the records could be received already containing tokenized versions of the textual comments.

As noted above, textual comments that have low usefulness metrics are not returned, as they are less likely to contain useful information. Such textual comments contain fewer technical terms and/or contain a greater fraction of non-technical terms and have been observed to be less useful in resolving technical problems in other records. However, textual comments having very high usefulness metrics are also not returned, as they are likely to be over-specific to a particular record, to contain non-user-readable content, or to be otherwise unhelpful in resolving a problem related to the search query. For example, a textual comment that contains only code, API calls, program version numbers, or other highly technical content will have a high usefulness index. However, it has been observed that such a comment is unlikely to be useful in contexts other that the record that contains it, e.g., due to the comment being highly specific and non-generalizable.

Accordingly, only those textual comments, from the set of relevant records, that have usefulness indexes within a pre-specified range are returned in response to the search query. Such a pre-specified range could be determined based on a sample of usefulness metrics. For example, the pre-specified range could correspond to an inter-quartile range of usefulness metrics of all of the textual comments in a particular record, all of the textual comments in a relevant set of records, all of the records in a database, or some other set of textual records.

The pre-specified range could be determined based on and/or specified by the user who input the search query. For example, the width of the range could be adjusted to increase or decrease the number of textual comments returned by the search. The range could be widened (e.g., from a range of 25% to 75% to a range of 15% to 85%) to increase the number of results returned to a technician, who is likely to have more time and be more inclined to peruse more records in order to resolve a problem. Conversely, a narrower range could be used to reduce the number of results returned to an end-user who more likely to be frustrated by a large set of search results. In another example, the extent of the range could be shifted upward (e.g., from a range of 25% to 75% to a range of 50% to 100%) to include higher-usefulness metric comments that are likely to be more technical and also more specific. The upper end of the range could be increase to provide a technician with more technical, more specific search results as the technician is more likely than an end-user to have the background to comprehend and take advantage of the more technical textual comments.

Results of the search may be provided in a variety of ways. For example, the search query could be input via a text box of a GUI, and the same GUI could be used to provide the returned textual comments in a list or in some other format. In some examples, the search query could take the form of a message or comment made in an email, messenger application, or other communications method and the returned textual comments could be provided via the communications method, e.g., as an auto-complete option. FIG. 7 shows an example of such a communications interface, which includes a number of messages (including message 710) between a user and a technician. The contents of the messages are used as a search query to identify potentially relevant textual comments, from potentially relevant records, according to the methods described herein. This process could be performed automatically, or in response to a user (e.g., a technician) requesting that such a search be performed. The search results (one or more textual comments) could then be provided in the GUI (e.g., as a suggested textual comment 730). The GUI could also include elements for interacting with the returned textual comments (e.g., the depicted elements 750) by indicating that a particular comment was helpful or not helpful, to remove a comment from view, to return additional comments, etc.

VI. Example Operations

Figure 8:
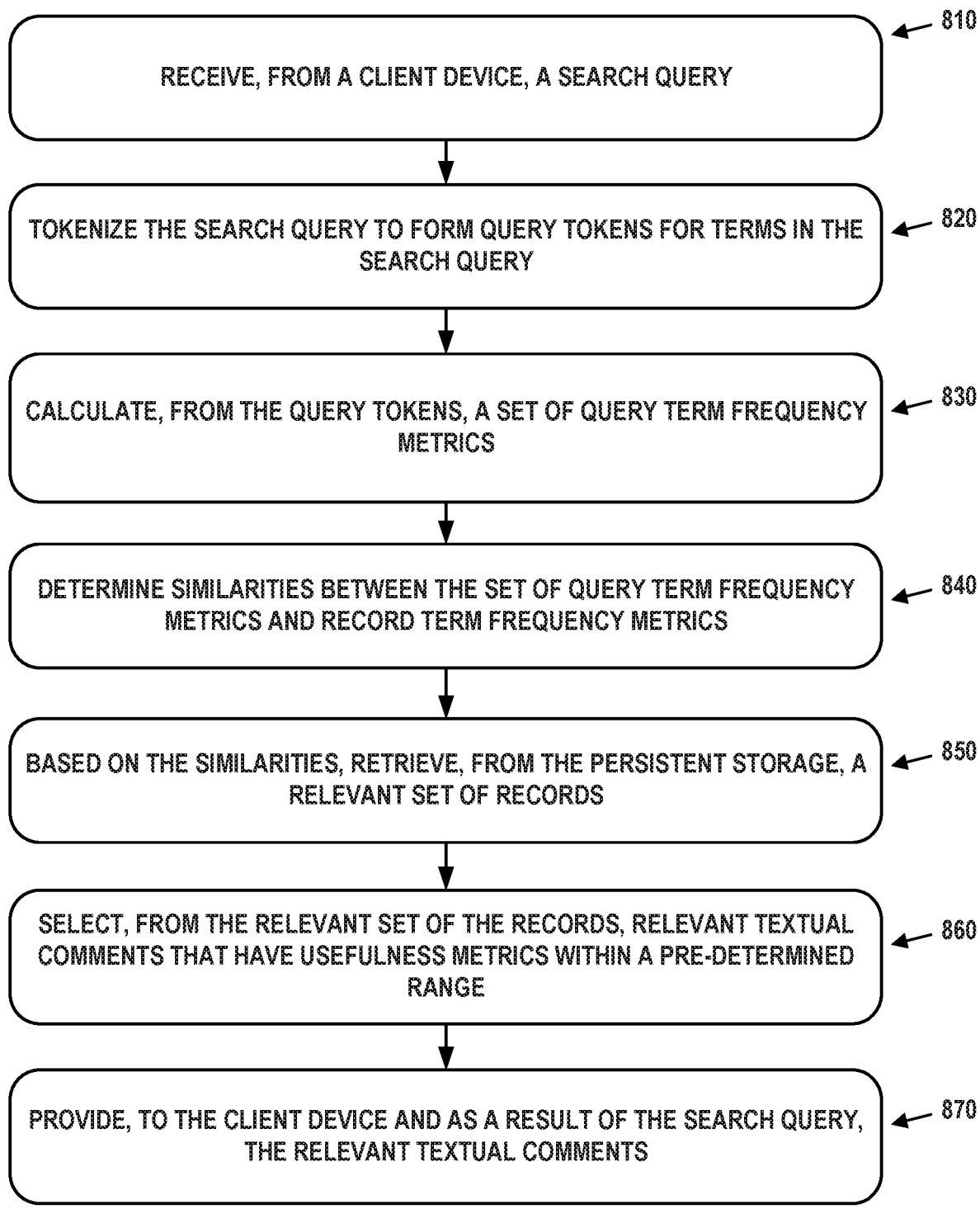
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

In the example embodiment of FIG. 8, persistent storage exists that contains: (i) a plurality of records related to operation of a managed network, the records containing textual summaries and textual comments, (ii) tokenized versions of the textual summaries and tokenized versions of the textual comments, both lacking stop words, common words, and punctuation, (iii) record term frequency metrics for the tokenized versions of the textual summaries, and (iv) usefulness metrics for the tokenized versions of the textual comments.

The example embodiment of FIG. 8 includes receiving, from a client device, a search query (810). This could include receiving the search query via a text box or other elements of a GUI. The example embodiment of FIG. 8 could include transmitting, to the client device, an indication of the GUI (e.g., HTML or other information sufficient to generate the GUI on a display or other user interface element(s)). Such a GUI could be provided, e.g., via a web interface. For example, the client device could send a request, over the Internet, for a technical support website or other service, and an indication of the contents of the GUI could be responsively transmitted to the client device.

The example embodiment of FIG. 8 additionally includes tokenizing the search query to form query tokens for terms in the search query (820). This can include removing, from the search query, common words, stop words, punctuation, and/or other elements of the search query that are not relevant, or that are less relevant, to the task of identifying records from the persistent storage that are related to the search query.

The example embodiment of FIG. 8 also includes calculating, from the query tokens, a set of query term frequency metrics (830). The example embodiment of FIG. 8 yet further includes determining similarities between the set of query term frequency metrics and the record term frequency metrics (840). The example embodiment of FIG. 8 additionally includes, based on the similarities, retrieving, from the persistent storage, a relevant set of the records (850).

The example embodiment of FIG. 8 also includes selecting, from the relevant set of the records, relevant textual comments that have usefulness metrics within a pre-determined range (860). The pre-determined range could be, e.g., an inter-quartile range of usefulness metrics for all of the comments stored in the persistent storage, or an inter-quartile range of usefulness metrics for a subset of comments or other contents stored in the persitetn storage. The example embodiment of FIG. 8 further includes providing, to the client device and as a result of the search query, the relevant textual comments (870).

The example embodiment of FIG. 8 could include additional or alternative steps or elements. For example, retrieving the relevant set of the records could include only retrieving the records that match a pre-determined search scope, where the pre-determined search scope controls an extent to which, for each of the relevant set of the records, each of the query tokens is required to be in the tokenized versions of the textual summaries. Such a pre-determined search scope could be based on a calculation, for each particular record of the records, that is based on a quotient of (i) an intersection of the query tokens and the tokenized versions of the textual summaries for the particular record, and (ii) a count of the query tokens.

In some embodiments, the search query could be entered into a graphical user interface of the client device. A representation of the graphical user interface could be generated and transmitted to the client device by the one or more computing devices. Such a graphical user interface could contain a drop-down menu that controls a threshold search scope value, and only retrieving the records that match the pre-determined search scope could include only retrieving the records with quotients that exceed the threshold search scope value.

In some embodiments, the pre-determined range could be an inter-quartile range.

In some embodiments, the common words are specified in a pre-determined corpus of English words.

In some embodiments, the term frequency metric for a particular term is based on a product of: (i) a number of times that the term appears in the textual summary, and (ii) a logarithm of a quotient of a count of the records and a count of the records containing the term.

In some embodiments, the relevant set of the records is a sequence of n most similar records ranked based on the similarities.

In some embodiments, the one or more computing devices are further configured to, before receiving the search query, generate the tokenized versions of the textual summaries and the tokenized versions of the textual comments by removing the stop words, common words, and punctuation therefrom.

In some embodiments, the usefulness metric for a particular textual comment is based on a quotient of: (i) a first count of tokens in the tokenized version of the particular textual comment that lacks the stop words, common words, and punctuation, and (ii) a second count of tokens in the tokenized version of the particular textual comment that includes the stop words, common words, and punctuation.

In some embodiments, the pre-determined range varies with type of a user operating the client device.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing: (i) a plurality of records related to operation of a managed network, the records containing textual summaries and textual comments, (ii) tokenized versions of the textual summaries and tokenized versions of the textual comments, both lacking stop words, common words, and punctuation, (iii) record term frequency metrics for the tokenized versions of the textual summaries, and (iv) usefulness metrics for the tokenized versions of the textual comments; and
   one or more computing devices configured to:
      receive, from a client device, a search query;
      tokenize the search query to form query tokens for terms in the search query;
      calculate, from the query tokens, a set of query term frequency metrics;
      determine similarities between the set of query term frequency metrics and the record term frequency metrics;
      based on the similarities, retrieve, from the persistent storage, a relevant set of the records;
      select, from the relevant set of the records, relevant textual comments that have usefulness metrics within a pre-determined range; and
      provide, to the client device and as a result of the search query, the relevant textual comments.

2. The system of claim 1, wherein retrieving the relevant set of the records comprises only retrieving the records that match a pre-determined search scope, wherein the predetermined search scope controls an extent to which, for each of the relevant set of the records, each of the query tokens is required to be in the tokenized versions of the textual summaries.

3. The system of claim 2, wherein the pre-determined search scope is based on a calculation, for each particular record of the records, based on a quotient of (i) an intersection of the query tokens and the tokenized versions of the textual summaries for the particular record, and (ii) a count of the query tokens.

4. The system of claim 3, wherein the search query is entered into a graphical user interface of the client device, wherein a representation of the graphical user interface was generated and transmitted to the client device by the one or more computing devices, and wherein the graphical user interface contains a drop-down menu that controls a threshold search scope value, and wherein only retrieving the records that match the pre-determined search scope comprises:
only retrieving the records with quotients that exceed the threshold search scope value.

5. The system of claim 1, wherein the pre-determined range is an inter-quartile range.

6. The system of claim 1, wherein the common words are specified in a pre-determined corpus of English words.

7. The system of claim 1, wherein a particular term frequency metric is for a term in a textual summary of a particular record in the records, and wherein the particular term frequency metric is based on a product of: (i) a number of times that the term appears in the textual summary, and (ii) a logarithm of a quotient of a count of the records and a count of the records containing the term.

8. The system of claim 1, wherein the relevant set of the records is a sequence of n most similar records ranked based on the similarities.

9. The system of claim 1, wherein the one or more computing devices are further configured to:
before receiving the search query, generate the tokenized versions of the textual summaries and the tokenized versions of the textual comments by removing the stop words, common words, and punctuation therefrom.

10. The system of claim 1, wherein a particular usefulness metric is for a tokenized version of a particular textual comment, and wherein the particular usefulness metric is based on a quotient of: (i) a first count of tokens in the tokenized version of the particular textual comment that lacks the stop words, common words, and punctuation, and (ii) a second count of tokens in the tokenized version of the particular textual comment that includes the stop words, common words, and punctuation.

11. The system of claim 1, wherein the pre-determined range varies with type of a user operating the client device.

12. A computer-implemented method comprising:
receiving, from a client device, a search query, wherein persistent storage contains: (i) a plurality of records related to operation of a managed network, the records containing textual summaries and textual comments, (ii) tokenized versions of the textual summaries and tokenized versions of the textual comments, both lacking stop words, common words, and punctuation, (iii) record term frequency metrics for the tokenized versions of the textual summaries, and (iv) usefulness metrics for the tokenized versions of the textual comments;
tokenizing the search query to form query tokens for terms in the search query;
calculating, from the query tokens, a set of query term frequency metrics;
determining similarities between the set of query term frequency metrics and the record term frequency metrics;
based on the similarities, retrieving, from the persistent storage, a relevant set of the records;
selecting, from the relevant set of the records, relevant textual comments that have usefulness metrics within a pre-determined range; and
providing, to the client device and as a result of the search query, the relevant textual comments.

13. The computer-implemented method of claim 12, wherein retrieving the relevant set of the records comprises only retrieving the records that match a pre-determined search scope, wherein the pre-determined search scope controls an extent to which, for each of the relevant set of the records, each of the query tokens is required to be in the tokenized versions of the textual summaries.

14. The computer-implemented method of claim 13, wherein the pre-determined search scope is based on a calculation, for each particular record of the records, based on a quotient of (i) an intersection of the query tokens and the tokenized versions of the textual summaries for the particular record, and (ii) a count of the query tokens.

15. The computer-implemented method of claim 14, wherein the search query is entered into a graphical user interface of the client device, wherein a representation of the graphical user interface was generated and transmitted to the client device by the one or more computing devices, and wherein the graphical user interface contains a drop-down menu that controls a threshold search scope value, and wherein only retrieving the records that match the pre-determined search scope comprises:
only retrieving the records with quotients that exceed the threshold search scope value.

16. The computer-implemented method of claim 12, wherein a particular term frequency metric is for a term in a textual summary of a particular record in the records, and wherein the particular term frequency metric is based on a product of: (i) a number of times that the term appears in the textual summary, and (ii) a logarithm of a quotient of a count of the records and a count of the records containing the term.

17. The computer-implemented method of claim 12, wherein the relevant set of the records is a sequence of n most similar records ranked based on the similarities.

18. The computer-implemented method of claim 12, further comprising:
before receiving the search query, generate the tokenized versions of the textual summaries and the tokenized versions of the textual comments by removing the stop words, common words, and punctuation therefrom.

19. The computer-implemented method of claim 12, wherein a particular usefulness metric is for a tokenized version of a particular textual comment, and wherein the particular usefulness metric is based on a quotient of: (i) a first count of tokens in the tokenized version of the particular textual comment that lacks the stop words, common words, and punctuation, and (ii) a second count of tokens in the tokenized version of the particular textual comment that includes the stop words, common words, and punctuation.

20. An article of manufacture including a non-transitory computer-readable medium, having stored thereon program instructions that, upon execution by a computing device, cause the computing device to perform operations comprising:

receiving, from a client device, a search query, wherein persistent storage contains: (i) a plurality of records related to operation of a managed network, the records containing textual summaries and textual comments, (ii) tokenized versions of the textual summaries and tokenized versions of the textual comments, both lacking stop words, common words, and punctuation, (iii) record term frequency metrics for the tokenized versions of the textual summaries, and (iv) usefulness metrics for the tokenized versions of the textual comments;

tokenizing the search query to form query tokens for terms in the search query;

calculating, from the query tokens, a set of query term frequency metrics;

determining similarities between the set of query term frequency metrics and the record term frequency metrics;

based on the similarities, retrieving, from the persistent storage, a relevant set of the records;

selecting, from the relevant set of the records, relevant textual comments that have usefulness metrics within a pre-determined range; and providing, to the client device and as a result of the search query, the relevant textual comments.

\* \* \* \* \*